(12) United States Patent
Qu

(10) Patent No.: US 9,170,801 B2
(45) Date of Patent: Oct. 27, 2015

(54) DATA CARD UPDATING METHOD, PERSONAL COMPUTER, AND DATA CARD

(71) Applicant: Huawei Device Co., Ltd., Shenzhen (CN)

(72) Inventor: Zhifeng Qu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/143,078

(22) Filed: Dec. 30, 2013

(65) Prior Publication Data

US 2014/0115194 A1    Apr. 24, 2014

Related U.S. Application Data

(63) Continuation of application No. PCT/CN2012/078533, filed on Jul. 12, 2012.

(30) Foreign Application Priority Data

Jul. 27, 2011  (CN) .......................... 2011 1 0212267

(51) Int. Cl.
*G06F 3/00* (2006.01)
*G06F 9/44* (2006.01)
*G06F 9/445* (2006.01)

(52) U.S. Cl.
CPC . *G06F 8/65* (2013.01); *G06F 8/665* (2013.01)

(58) Field of Classification Search
CPC ................................ G06F 3/00; G06F 9/4411
USPC .......................................................... 710/8
See application file for complete search history.

(56) References Cited

U.S. PATENT DOCUMENTS

| 6,922,548 | B1* | 7/2005 | Moore et al. ................. 455/41.2 |
| 7,150,013 | B2 | 12/2006 | Kim |
| 8,136,085 | B2* | 3/2012 | Skillman et al. .............. 717/100 |
| 2004/0203296 | A1* | 10/2004 | Moreton et al. .............. 439/894 |
| 2008/0065788 | A1 | 3/2008 | Chow et al. |
| 2009/0119659 | A1 | 5/2009 | Zou et al. |
| 2012/0096451 | A1* | 4/2012 | Tenbarge et al. ............. 717/170 |

(Continued)

FOREIGN PATENT DOCUMENTS

| CN | 101430645 | A | 5/2009 |
| CN | 101620686 | A | 1/2010 |
| CN | 101639771 | A | 2/2010 |
| CN | 101655823 | A | 2/2010 |

(Continued)

OTHER PUBLICATIONS

Foreign Communication From a Counterpart Application, Chinese Application No. 201110212267.3, Chinese Office Action dated Feb. 5, 2013, 2 pages.

(Continued)

*Primary Examiner* — Titus Wong
(74) *Attorney, Agent, or Firm* — Conley Rose, P.C.; Grant Rodolph; Nicholas K. Beaulieu

(57) ABSTRACT

The technical solutions disclose a data card software updating method, a data card, and a personal computer. In the method, a mapped interface is switched first, and then an existing data card updating method is adopted to update a data card that provides only a remote network driver interface specification (RNDIS) interface through mapping. The technical solutions can conveniently achieve compatibility with the existing data card updating method, and can be implemented simply and efficiently.

19 Claims, 3 Drawing Sheets

(56) References Cited

U.S. PATENT DOCUMENTS

2012/0102238 A1* 4/2012 Wei .................................. 710/13
2012/0124489 A1   5/2012 Zhao et al.
2012/0266151 A1  10/2012 Kong et al.

FOREIGN PATENT DOCUMENTS

| CN | 101751353 A | 6/2010 |
| CN | 101964955 A | 2/2011 |
| CN | 102236571 A | 11/2011 |
| EP | 2128760 A1 | 2/2009 |

OTHER PUBLICATIONS

Foreign Communication From a Counterpart Application, European Application No. 12818213.6, Extended European Search Report dated Jun. 2, 2014, 7 pages.

Foreign Communication From a Counterpart Application, PCT Application No. PCT/CN2012/078533, English Translation of International Search Report dated Oct. 18, 2012, 2 pages.

Foreign Communication From a Counterpart Application, PCT Application No. PCT/CN2012/078533, English Translation of Written Opinion dated Oct. 18, 2012, 7 pages.

* cited by examiner

DATA CARD UPDATING METHOD, PERSONAL COMPUTER, AND DATA CARD

CROSS-REFERENCE TO RELATED APPLICATIONS

This application is a continuation of International Application No. PCT/CN2012/078533, filed on Jul. 12, 2012, which claims priority to Chinese Patent Application No. 201110212267.3, filed on Jul. 27, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the application field of mobile communications, and in particular to a data card updating method, a personal computer, and a data card.

BACKGROUND

A data card (also called a wireless network card), as one of the fast and convenient communications products, gets more and more popular among people. Therefore, it is particularly important to timely and securely update internal software of the data card. For a category of data cards, a personal computer user interface (PCUI) and a diagnose (DIAG) interface may be directly mapped during an updating process, and an updating tool may install software in the data card directly through the two interfaces for a purpose of updating.

However, for another category of data cards, the PCUI and the DIAG are not mapped, and instead, a network card interface, that is, a remote network driver interface specification (RNDIS) interface is only virtualized. In this case, if a method for updating the former category of data cards is still used, a failure in interface searching may occur, or a failure in interface opening may occur, so that an updating program is directly exited, resulting in that software cannot be installed in the data card.

SUMMARY

A data card updating method, a personal computer, and a data card according to embodiments of the present invention may enable a data card, which provides only an RNDIS interface through mapping, to implement software updating successfully by using an existing software updating method, and the implementation is simple and efficient.

In one aspect, an embodiment of the present invention provides a data card updating method, where a data card is connected to a personal computer, and the data card provides an RNDIS interface through mapping. The method includes: sending, by the personal computer, an interface switching request or a web page request to the data card through the RNDIS interface, where the interface switching request and the web page request are used to instruct the data card to switch the RNDIS interface into a PCUI; and upon determining that the RNDIS interface of the data card is switched successfully, transmitting, by the personal computer, a software update package to the data card through the PCUI, so as to perform installation.

In another aspect, the present invention provides a data card updating method, where a data card is connected to a personal computer, and the data card provides an RNDIS interface through mapping. The method includes: receiving, by the data card, an interface switching request or a web page request sent through the RNDIS interface by the personal computer; according to the interface switching request or the web page request, switching the RNDIS interface into a PCUI; and when the personal computer determines that the RNDIS interface of the data card is switched successfully, receiving, by the data card, a software update package transmitted through the PCUI by the personal computer, and performing installation.

In another aspect, the present invention provides a personal computer, connected to a data card and configured to update the data card, where the data card provides an RNDIS interface through mapping. The personal computer includes: a request sending module configured to send an interface switching request or a web page request to the data card through the RNDIS interface, where the interface switching request and the web page request are used to instruct the data card to switch the RNDIS interface into a PCUI; a switch determining module configured to determine whether the RNDIS interface of the data card is switched successfully; and a software transmitting module configured to, when the switch determining module determines that the RNDIS interface of the data card is switched successfully, transmit a software update package to the data card through the PCUI, so as to perform installation.

In still another aspect, an embodiment of the present invention provides a data card connected to a personal computer, where the data card provides an RNDIS interface through mapping. The data card includes: a request receiving module configured to receive an interface switching request or a web page request, the interface switching request and the web page request sent through the RNDIS interface by the personal computer; an interface switching module configured to, according to the interface switching request or the web page request, the interface switching request and the web page request, switch the RNDIS interface into a PCUI; and an updating module configured to, when the personal computer determines that the RNDIS interface of the data card is switched successfully, receive a software update package transmitted through the PCUI by the personal computer, and perform installation.

It can be seen from the foregoing solutions that, in the data card updating method, the personal computer, and the data card according to the embodiments of the present invention, a mapped interface is first switched, then an existing data card updating method may be adopted to conveniently update a data card that provides only an RNDIS interface through mapping, so as to conveniently achieve compatibility with the existing data card updating method, and implementation is simple and efficient.

DETAILED DESCRIPTION

Figure 1:
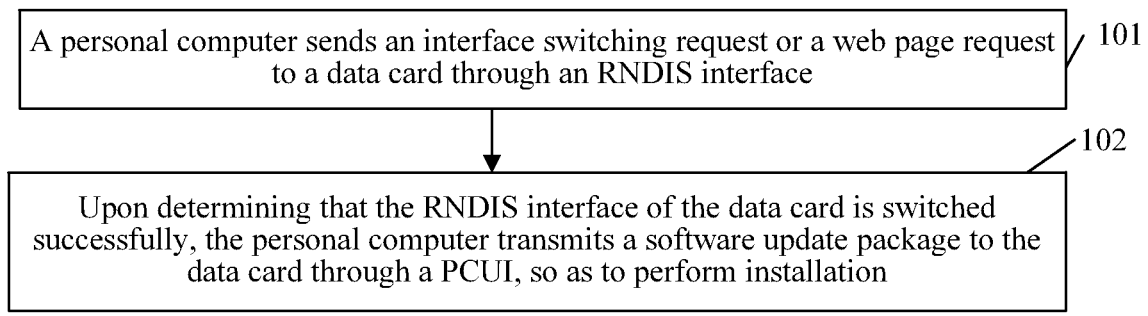
FIG. 1 is a schematic flow chart of a method according to a first embodiment of the present invention.

The following describes specific implementation manners with reference to the accompanying drawings.

To better understand the solutions of the embodiments of the present invention, an existing data card updating solution (which is applicable to a data card with interfaces in PCUI and DIAG forms being obtained by direct mapping) is first introduced briefly, and the following takes updating of board software (that is, software installed in a data card and configured to implement functions, such as sending a short message, making a call, and accessing the Internet) as an example. After the data card is connected to a personal computer through an interface, for example, a Universal Serial Bus (USB) interface, a personal computer memory card international association (PCMCIA) interface, or another interface, the data card provides, through mapping, two virtual interfaces PCUI and DIAG for communications. When a software updating tool loaded into the personal computer is clicked and executed, a downloading procedure is entered, and various data in the following process is all transmitted through the virtual interface PCUI. After the downloading procedure starts, the software updating tool first queries a downloading mode, and needs to determine, according to a customized version number, whether authentication is required, no matter if a query result shows a normal downloading mode or a forced downloading mode. If it is in the normal downloading mode, and authentication is required, the personal computer pops up a password box for a user to input a password. After the password is verified successfully, the software updating tool checks and collects statistics about Bin files. If it is in the normal downloading mode, and authentication is not required, the software updating tool directly checks and collects statistics about Bin files. If it is in the forced downloading mode, and authentication is required, exit an updating program. Exiting of the updating program is designed based on a consideration of confidentiality and security of software copyright, so that mutual updating between customized versions is limited in the forced downloading mode. If it is in the forced downloading mode, and authentication is not required, the software updating tool directly checks and collects statistics about Bin files. After the Bin files are checked and statistics of the Bin files are collected successfully, a nonvolatile storage item is backed up. If the nonvolatile storage item is backed up successfully, the data card is switched into a data writing mode. After the data writing mode is switched into, an International Mobile Station Equipment Identity (IMEI) number is queried first, and after a query succeeds, the nonvolatile storage item is restored, and after the nonvolatile storage item is restored successfully, a whole updating process is completed successfully. If every aspect starting from the checking and statistics collecting of the Bin files fails, exit the updating program.

It can be seen that, the foregoing updating procedure or another updating method requiring data to be transmitted through the PCUI are not directly applicable to a data card (also called a flash card) that provides only an RNDIS interface through mapping after being connected to a personal computer.

Therefore, a first embodiment of the present invention provides a data card updating method, and the method is applicable to a data card that provides a mapped interface being an RNDIS interface after being connected to a personal computer. When the method is used, the data card is connected to the personal computer through an interface such as a USB or PCMCIA interface. The personal computer is loaded with a software updating tool, and after the software updating tool is clicked by a user and runs, execution of the method starts. The method specifically includes the following steps (as shown in FIG. 1):

101: A personal computer sends an interface switching request or a web page request to a data card through the RNDIS interface, where the interface switching request and the web page request are used to instruct the data card to switch the RNDIS interface into a PCUI, and during actual switching, the RNDIS interface is switched into two interfaces, namely a PCUI and a DIAG, and data is mainly transferred by using the PCUI interface in an updating process.

102: Upon determining that the RNDIS interface of the data card is switched successfully, the personal computer transmits a software update package to the data card through the PCUI, so as to perform installation.

It should be noted that, the method of this embodiment is only applicable to a data card that provides an RNDIS interface through mapping, so that before the method is implemented, it may be first determined whether a data card connected to the personal computer is a data card of this type, that is, a flash card. A specific method for determination is that: (1) after the software updating tool runs, a resource file is released to a temporary directory of the personal computer, where the resource file includes a driver installation file, a configuration file, and so on. By reading content in the configuration file, the personal computer can determine whether the currently to-be-updated is a flash card. Specifically, a flash card flag bit may be set in the configuration file, for example, if a character string of the flag bit is TRUE, it is determined that it is a flash card; if the character string of the flag bit is FALSE, it is determined that it is not a flash card. Or (2), after the software updating tool runs, it is directly determined, by searching, whether an interface provided by the data card through mapping includes the PCUI. A searching method is that: a system application program interface (API) interface is called first to enumerate and process all interfaces; then according to a to-be-searched PCUI name, matching is performed on names of all interfaces that are obtained through mapping; if the matching succeeds, it indicates that the PCUI is found, and the to-be-updated data card is not a flash card; if the matching does not succeed, it indicates that no PCUI is found, and the to-be-updated data card is a flash card.

After the methods (1) and (2) are used, if it is determined that it is a flash card, directly enter a flash card updating procedure (referring to step 101 and step 102); if it is determined that it is not a flash card, enter an existing data card updating procedure. For the method (2), if no PCUI is found, it may result from another reason (for example, an error occurs during a mapping process) rather than that the data card is not a flash card, and in this case, the flash card updating procedure may be directly entered (referring to step 101 and step 102).

During specific implementation of a port switching request in step 101 and step 102, a hypertext transfer protocol (HTTP) request may be selected for implementation. Packet content of the HTTP request may be:

---

"<?xml version=\"1.0\" encoding=\"UTF-8\"?>\
<api version=\"1.0\">\
<header>\
<function>switchMode</function>\
</header>\

```
<body>\
<request>\
<switchType>0</switchType>\
</request>\
</body>\
</api>"
```

The foregoing packet content is in a standard extensible markup language (XML) text format. A Function field is of a string type and indicates that a switch mode interface is not used herein. A SwitchType field is of an integer type, indicates a mode that is switched to, and has two values, namely, 0 and 1, where 0 indicates that an engineering mode is switched to, and 1 indicates that a debug mode is switched to.

The web page request has the same packet content as the preceding HTTP request. For the HTTP request, the packet content assembled in code is directly sent to a WebService module (the WebService module is a part of board software and is configured to process interaction between the personal computer and a network side or interaction between the data card and the network side); the operation for sending the web page request is to start a browser and open a specified web page, the browser obtains to-be-sent packet content through a Jscript script, and directly sends the obtained packet content to the WebService module, and then the board software switches a port.

The interface switching request and the web page request are both used to convey an interface switching instruction to the data card.

Further, in this embodiment, the personal computer may determine, by searching for the PCUI, whether the RNDIS interface of the data card is switched successfully. If the PCUI can be found, it indicates that the RNDIS interface of the data card is already switched successfully; otherwise, it indicates that the RNDIS interface of the data card is not switched successfully.

Further, after the interface switching request is sent, if the personal computer determines that the interface of the data card is not switched successfully, exit the updating process or re-execute step 101 and step 102.

In the data card updating method according to the first embodiment of the present invention, the personal computer first notifies the data card of switching a mapped interface, and then the existing data card method may be adopted to conveniently update the data card that only provides the RNDIS interface through mapping. The method may conveniently achieve compatibility with the existing data card updating method, and can be implemented simply and efficiently.

Figure 2:
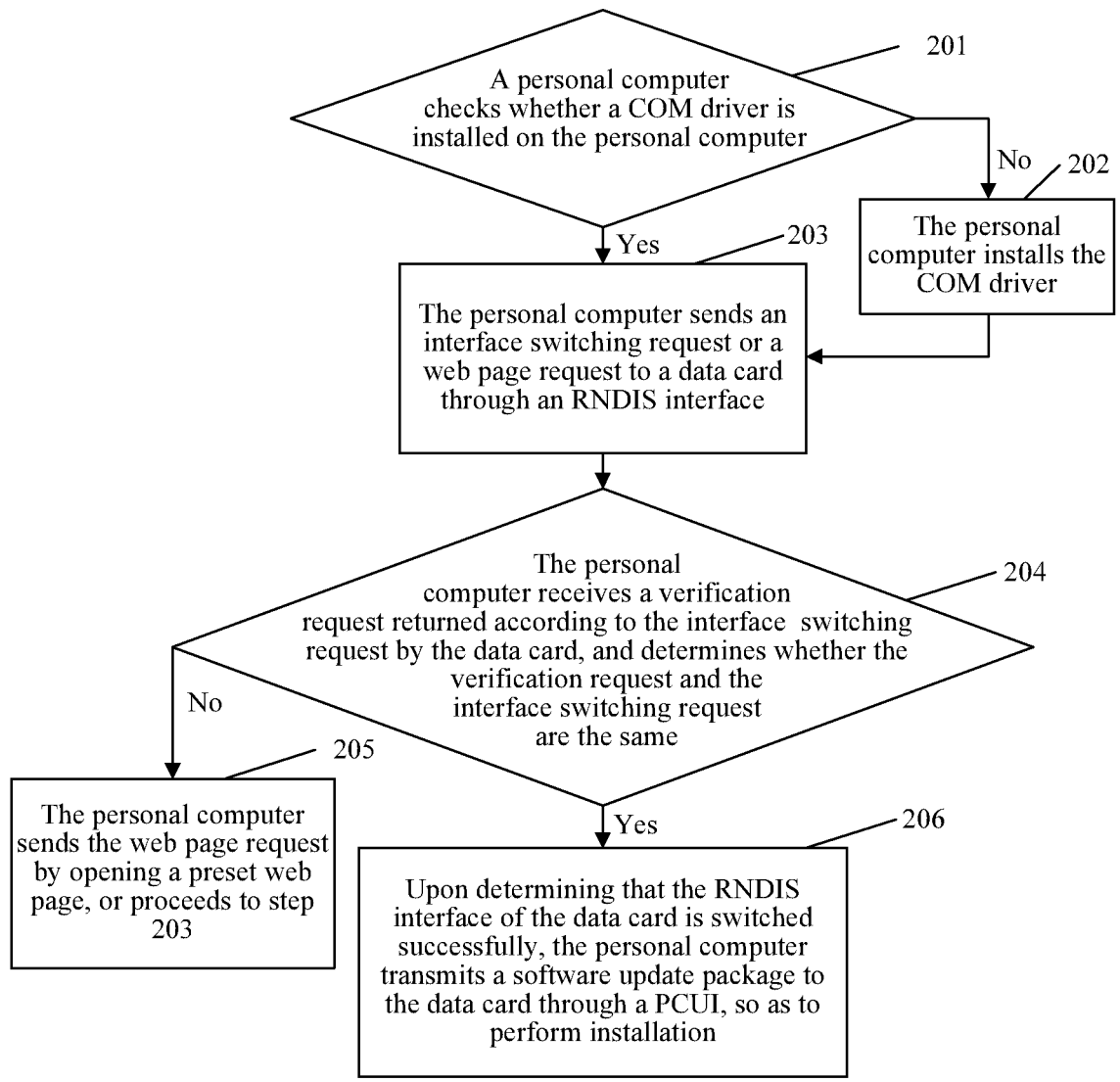
FIG. 2 is a schematic flow chart of a method according to a second embodiment of the present invention.

A second embodiment of the present invention provides a data card updating method, and as shown in FIG. 2, the method is applicable to a data card that provides a mapped interface being an RNDIS interface after being connected to a personal computer. When the method is used, the data card is connected to the personal computer through an interface such as a USB or PCMCIA interface. The personal computer is loaded with a software updating tool, and after the software updating tool is clicked by a user and runs, execution of the method starts. The method specifically includes the following steps:

201: A personal computer checks whether a component object model (COM) driver is already installed on the personal computer; if the COM driver is already installed, proceed to step 203, and if the COM driver is not installed, proceed to step 202.

Only after the COM driver is installed on the personal computer, can a PCUI and a DIAG be obtained through mapping after a data card switches an interface. During actual switching, an RNDIS interface is switched into two interfaces, namely, the PCUI and the DIAG interface. During an updating process, data is transferred mainly by using the PCUI interface; otherwise, on a user interface of the personal computer, a yellow exclamation mark is displayed for the PCUI and the DIAG that are obtained through mapping, and communication cannot be normally performed.

Optionally, step 201 may not exist, that is, the personal computer does not determine whether the COM driver is already installed, but directly enters the following step 202.

202: The personal computer installs the COM driver, and after the installation succeeds, proceeds to step 203.

Optionally, if installation does not succeed, step 203 is not proceeded to, and the updating process stops.

203: The personal computer sends an interface switching request or a web page request to a data card through the RNDIS interface, where the interface switching request and the web page request are used to instruct the data card to switch the RNDIS interface into two interfaces, namely a PCUI and a DIAG.

Specifically, a software updating tool in the personal computer delivers the interface switching request to a WebService module in the data card through the RNDIS interface on the personal computer side, and upon receiving the interface switching request through the WebService module, the board software switches the RNDIS interface into PCUI and DIAG forms.

204: The personal computer receives a verification request returned according to the interface switching request by the data card; if the verification request and the sent interface switching request are the same, proceed to 206; if the verification request and the sent interface switching request are different, proceed to 205.

Optionally, upon receiving the interface switching request, in order to ensure that a port is switched correctly, the WebService module may further return the received interface switching request to the software updating tool in the personal computer for verification, that is, step 204. If a verification result indicates that they are the same, directly enter step 206; if the verification result indicates that they are different, convey the interface switching instruction to the data card again (for example, step 205). Step 204 may also be omitted, and step 206 is directly performed.

Optionally, if a step of verifying whether the sent interface switching request is correct in step 204 is not adopted, a step of a timeout handling mechanism may further be adopted. That is to say, after the interface switching request is sent, the updating tool waits for a response of a data card side and determines, by parsing, whether the response is correct, and time for waiting for the response of the data card side is preset time. If the preset time is exceeded, directly proceed to step 205.

205: The personal computer sends the web page request by opening a preset web page, or proceeds to step 203, that is, sends the interface switching request to the data card through the RNDIS interface again.

The web page request is used to instruct the data card to switch the RNDIS interface into the PCUI and the DIAG.

It can be understood that, the interface switching request (for example, an HTTP request) sent by the software updating tool to the WebService module may be intercepted by a firewall on the personal computer, so that the interface switching request sent by the personal computer cannot reach the WebService module, thereby eventually making the whole software updating process fail. In order to increase a success rate of port switching, a mechanism of sending an interface switching instruction (for example, a web page request or an interface switching request) again is further provided herein, that is, step 205. In step 205, the software updating tool may open a browser to link to a specified network address, for example, http://192.168.1.1/html/switchProjectMode.html, and request, through a web page, interface switching. The web page request has the same packet content as the preceding HTTP request, which is not repeated herein. For the HTTP request, packet content assembled in code is directly sent to the WebService module; the operation for sending the web page request is to start the browser and open a specified web page, the browser obtains to-be-sent packet content through a Jscript script, and directly sends the obtained packet content to the WebService module, and then the board software switches the port.

206: Upon determining that the RNDIS interface of the data card is switched successfully, the personal computer transmits a software update package to the data card through the PCUI, so as to perform installation.

The personal computer may adopt the method used in the first embodiment to determine whether the RNDIS interface of the data card is switched successfully. If the switching succeeds, the software update package is transmitted to the data card through the PCUI, so as to implement the existing data card updating scheme.

In the data card updating method according to the second embodiment of the present invention, in addition to that the interface is switched first to apply the existing data card updating method to the data card providing only the RNDIS interface through mapping, verification and retransmission mechanisms are also provided, so as to increase the success rate of interface switching, and prevent the updating process from being stopped due to that the interface switching request is intercepted or an error occurs in a sending process, thereby improving updating efficiency of the data card.

Figure 3:
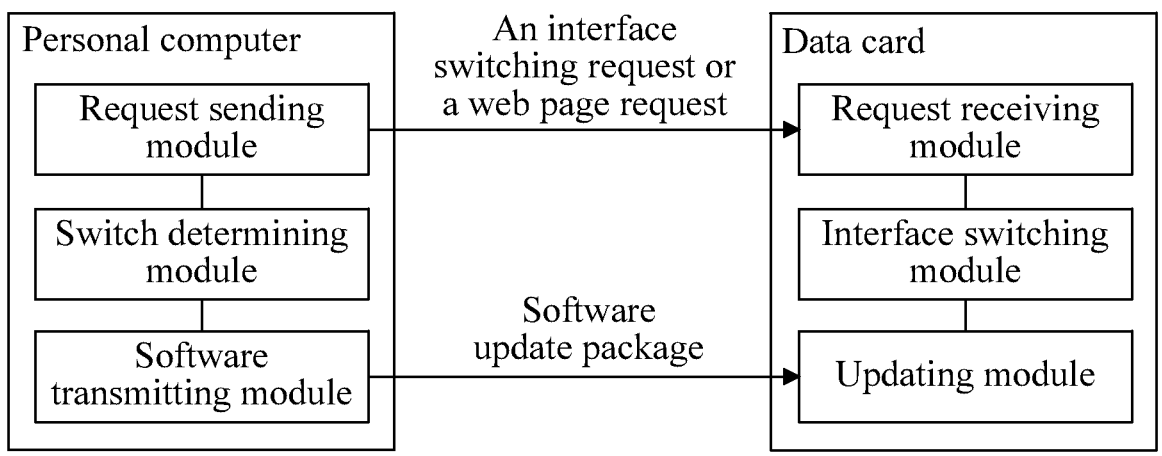
FIG. 3 is a schematic structural diagram of a personal computer and a data card according to a third embodiment of the present invention.

FIG. 3 shows a third embodiment of the present invention. The third embodiment provides a personal computer and a data card that use the method of the first embodiment, and all explanations and descriptions in the first embodiment are also applicable to this embodiment. The personal computer includes: a physical interface (for example, a USB interface or a PCMCIA interface) connected to the data card; at least one processor; a storage unit; and at least one program. The at least one program is stored in the storage unit, and is executed by the one or more processors. The at least one program includes a software updating tool. After being connected to the personal computer, the data card only provides an RNDIS interface through mapping, and is a flash card. The data card includes a physical interface connected to the personal computer, and further includes board software. The board software includes a WebService module and so on.

Specifically, the personal computer includes: a request sending module configured to send an interface switching request or a web page request to the data card through the RNDIS interface, where the interface switching request and the web page request are used to instruct the data card to switch the RNDIS interface into a PCUI, and during actual switching, the RNDIS interface is switched into two interfaces, namely a PCUI and a DIAG, and data is transferred mainly by using the PCUI interface during updating; a switch determining module configured to determine whether the RNDIS interface of the data card is switched successfully; and a software transmitting module configured to, when the switch determining module determines that the RNDIS interface of the data card is switched successfully, transmit a software update package to the data card through the PCUI, so as to perform installation.

It can be understood that, the request sending module, the switch determining module, and the software transmitting module may specifically be implemented through instructions of the software updating tool.

The data card includes: a request receiving module configured to receive the interface switching request or the web page request, the interface switching request and the web page request sent through the RNDIS interface by the personal computer; an interface switching module configured to, according to the interface switching request or the web page request, switch the RNDIS interface into a PCUI; and an updating module configured to, when the personal computer determines that the RNDIS interface of the data card is switched successfully, receive the software update package transmitted through the PCUI by the personal computer, and perform installation.

It can be understood that, the request receiving module may specifically be implemented by the WebService module, and the interface switching and updating modules may be implemented by the board software.

In the data card and the personal computer according to the third embodiment of the present invention, the data card is first notified of switching a mapped interface, and then the existing data card method may be adopted to conveniently update the data card that only provides the RNDIS interface through mapping. The method may conveniently achieve compatibility with the existing data card updating method, and can be implemented simply and efficiently.

A fourth embodiment of the present invention further provides a personal computer and a data card that use the method of the second embodiment, and all explanations and descriptions in the second embodiment are also applicable to this embodiment.

Specifically, the personal computer includes: a request sending module configured to send an interface switching request or a web page request to the data card through an RNDIS interface, where the interface switching request and the web page request are used to instruct the data card to switch the RNDIS interface into a PCUI, and during actual switching, the RNDIS interface is switched into two interfaces, namely a PCUI and a DIAG, and data is transferred mainly by using the PCUI interface during updating; a switch determining module configured to determine whether the RNDIS interface of the data card is switched successfully; and a software transmitting module configured to, when the switch determining module determines that the RNDIS interface of the data card is switched successfully, transmit a software update package to the data card through the PCUI, so as to perform installation.

Optionally, the personal computer further includes a detecting module and a driver installing module. The detecting module is configured to detect whether a COM driver is already installed on the computer; if the COM driver is already installed, notify the request sending module of sending the interface switching request directly through the RNDIS interface; if the COM driver is not installed, notify the driver installing module of installing the COM driver. The driver installing module is configured to, according to notification of the detecting module, install the COM driver, and after the installation succeeds, notify the request sending module of sending the interface switching request or the web page request through the RNDIS interface.

The request sending module is specifically configured to, according to the notification of the detecting module or the driver installing module, send the interface switching request or the web page request to the data card through the RNDIS interface.

Optionally, the personal computer further includes: a verifying module configured to receive a verification request returned according to the interface switching request by the data card, determine whether the verification request and the interface switching request are the same, and if the verification request and the interface switching request are the same, notify the switch determining module of performing a determination operation.

Upon determining that the verification request and the interface switching request are different, the verifying module notifies the request sending module. The request sending module is further configured to, according to the notification of the verifying module, send the web page request by opening a preset web page; or send the interface switching request to the data card through the RNDIS interface again.

If the verifying module does not receive the verification request when preset time is reached, the verifying module notifies the request sending module. The request sending module is further configured to, according to the notification of the verifying module, send the interface switching request to the data card through the RNDIS interface again, or send the web page request by opening the preset web page.

It can be understood that, the request sending module, the switch determining module, the detecting module, the driver installing module, the verifying module, and the software transmitting module may specifically be implemented through instructions of the software updating tool.

The data card specifically includes: a request receiving module configured to receive the interface switching request or the web page request, the interface switching request and the web page request sent through the RNDIS interface by the personal computer; an interface switching module configured to, according to the interface switching request or the web page request, switch the RNDIS interface into a PCUI; and an updating module configured to, when the personal computer determines that the RNDIS interface of the data card is switched successfully, receive the software update package transmitted through the PCUI by the personal computer, and perform installation.

Optionally, the data card further includes a verification request returning module configured to, according to the interface switching request, return the verification request to the personal computer. When the personal computer determines that the verification request and the interface switching request are the same, the personal computer continues a subsequent process of determining whether the interface is switched successfully.

Optionally, the request receiving module is further configured to, when the personal computer determines that the verification request and the interface switching request are different, receive the web page request sent, by opening the preset web page, by the personal computer; or receive the interface switching request sent through the RNDIS interface again by the personal computer.

Optionally, the request receiving module is further configured to, when the personal computer does not receive the verification request when the preset time is reached, receive the interface switching request sent through the RNDIS interface again by the personal computer, or receive the web page request sent, by opening the preset web page, by the personal computer.

It can be understood that, the request receiving module and the verification request returning module may specifically be implemented by a WebService module, and the interface switching and updating modules may be implemented by board software.

A person of ordinary skill in the art may understand that, all of or a part of the steps in the method according to the embodiments may be implemented by a program instructing relevant hardware. The program may be stored in a computer readable storage medium. When the program runs, the implemented steps are the same as those of the method. The storage medium is such as a read-only memory (ROM)/random-access memory (RAM), a magnetic disk, or an optical disc.

The foregoing describes specific embodiments of the present invention, and appropriate improvements may be made to the method of the present invention in a specific implementation process to meet specific requirements in specific situations. Therefore, it can be understood that, the specific implementation manners of the present invention are only exemplary, and are not intended to limit the protection scope of the present invention.

What is claimed is:

1. A data card updating method, comprising:
    connecting, by a personal computer, with the data card through a universal serial bus (USB) interface, wherein the USB interface is mapped to a remote network driver interface specification (RNDIS) interface on a device manager of the personal computer;
    sending, by the personal computer, an interface switching request to the data card through the RNDIS interface when internal software of the data card needs updating, wherein the interface switching request is configured to instruct the data card to switch the RNDIS interface into a personal computer user interface (PCUI);
    determining, by the personal computer, whether the RNDIS interface is switched to the PCUI successfully; and
    transmitting, by the personal computer, a software update package to the data card through the PCUI to perform installation when the RNDIS interface is switched to the PCUI successfully.

2. The method according to claim 1, wherein the method further comprises:
    detecting, by the personal computer, whether a component object model (COM) driver is already installed on the personal computer;
    sending, by the personal computer, the interface switching request directly through the RNDIS interface when the COM driver is already installed; and
    installing, by the personal computer, the COM driver first and sending the interface switching request after the installation succeeds when the COM driver is not installed.

3. The method according to claim 1, wherein after sending, by the personal computer, the interface switching request, the method further comprises:
    receiving, by the personal computer, a verification request returned by the data card according to the interface switching request; and
    when the personal computer determines that the verification request and the interface switching request are the same, continuing a subsequent process of determining whether the RNDIS interface is switched to the PCUI successfully.

4. The method according to claim 3, wherein when the personal computer determines that the verification request and the interface switching request are different, the personal computer sends a web page request by opening a preset web page, or the interface switching request is sent to the data card through the RNDIS interface again.

5. The method according to claim 3, wherein after sending, by the personal computer, the interface switching request, the method further comprises sending, by the personal computer, the interface switching request to the data card through the RNDIS interface again, or sending a web page request by opening a preset web page when the personal computer does not receive the verification request when a preset time is reached.

6. A data card updating method, comprising:
connecting, by the data card, to a personal computer through a universal serial bus (USB) interface, wherein the USB interface is mapped to a remote network driver interface specification (RNDIS) interface on a device manager of the personal computer;
receiving, by the data card, an interface switching request sent through the RNDIS interface by the personal computer when internal software of the data card needs updating, wherein the interface switching request is configured to instruct the data card to switch the RNDIS interface into a personal computer user interface (PCUI);
switching, by the data card, the RNDIS interface into the PCUI; and
receiving, by the data card, a software update package transmitted through the PCUI by the personal computer, and performing installation when the RNDIS interface is switched to the PCUI successfully.

7. The method according to claim 6, wherein the method further comprises:
detecting, by the personal computer, whether a component object model (COM) driver is already installed on the personal computer;
receiving, by the data card, the interface switching request sent directly through the RNDIS interface by the personal computer when the COM driver is already installed; and
installing, by the personal computer, the COM driver first, and after the installation succeeds, receiving, by the data card, the interface switching request sent by the personal computer when the COM driver is not installed.

8. The method according to claim 6, wherein after receiving, by the data card, the interface switching request, the method further comprises:
returning, by the data card, a verification request to the personal computer according to the interface switching request; and
when the personal computer determines that the verification request and the interface switching request are the same, continuing, by the personal computer, a subsequent process of determining whether the RNDIS interface is switched to the PCUI successfully.

9. The method according to claim 8, wherein when the personal computer determines that the verification request and the interface switching request are different, the data card receives a web page request sent, by opening a preset web page, by the personal computer, or the data card receives the interface switching request sent through the RNDIS interface again by the personal computer.

10. The method according to claim 8, wherein after sending, by the personal computer, the interface switching request, the method further comprises:
receiving, by the data card, the interface switching request sent through the RNDIS interface again by the personal computer when the personal computer does not receive the verification request when a preset time is reached; or
receiving a web page request sent, by opening a preset web page, by the personal computer.

11. A personal computer, comprising:
a request sending module configured to send an interface switching request to a data card through a remote network driver interface specification (RNDIS) interface, wherein the personal computer connects with the data card through a universal serial bus (USB) interface, wherein the USB interface is mapped to the RNDIS interface on a device manager of the personal computer, and wherein the interface switching request is configured to instruct the data card to switch the RNDIS interface into a personal computer user interface (PCUI) when internal software of the data card needs updating;
a switch determining module configured to determine whether the RNDIS interface is switched to the PCUI successfully; and
a software transmitting module configured to transmit a software update package to the data card through the PCUI to perform installation when the RNDIS interface is switched to the PCUI successfully.

12. The personal computer according to claim 11, wherein the personal computer further comprises:
a detecting module configured to detect whether a component object model (COM) driver is already installed on the computer, notify the request sending module of sending the interface switching request directly through the RNDIS interface when the COM driver is already installed, and notify a driver installing module of installing the COM driver when the COM driver is not installed; and
the driver installing module configured to, according to notification of the detecting module, install the COM driver, and after the installation succeeds, notify the request sending module of sending the interface switching request through the RNDIS interface, and
wherein the request sending module is specifically configured to, according to the notification of the detecting module or the driver installing module, send the interface switching request to the data card through the RNDIS interface.

13. The personal computer according to claim 11, wherein the personal computer further comprises a verifying module configured to receive a verification request returned according to the interface switching request by the data card, determine whether the verification request and the interface switching request are the same, and when the verification request and the interface switching request are the same, notify the switch determining module of performing a determination operation.

14. The personal computer according to claim 13, wherein when the verifying module determines that the verification request and the interface switching request are different, the verifying module notifies the request sending module, and wherein the request sending module is further configured to, according to the notification of the verifying module, send a web page request by opening a preset web page, or send the interface switching request to the data card through the RNDIS interface again.

15. The personal computer according to claim 13, wherein when the verifying module does not receive the verification request when a preset time is reached, the verifying module notifies the request sending module, and wherein the request sending module is further configured to, according to the notification of the verifying module, send the interface switching request to the data card through the RNDIS interface again, or send a web page request by opening a preset web page.

16. A data card, comprising:
   a request receiving module configured to receive an interface switching request, wherein the interface switching request is configured to instruct the data card to switch a remote network driver interface specification (RNDIS) interface into a personal computer user interface (PCUI),
   wherein the interface switching request is sent through the RNDIS interface by a personal computer when internal software of the data card needs updating, wherein the data card is connected to the personal computer through a universal serial bus (USB) interface, and
   wherein the USB interface is mapped to a RNDIS interface on a device manager of the personal computer;
   an interface switching module configured to, according to the interface switching request, switch the RNDIS interface into the PCUI; and
   an updating module configured to receive a software update package transmitted through the PCUI by the personal computer, and perform installation when the RNDIS interface is switched to the PCUI successfully.

17. The data card according to claim 16, wherein the data card further comprises:
   a verification request returning module configured to, according to the interface switching request, return a verification request to the personal computer; and
   when the personal computer determines that the verification request and the interface switching request are the same, the personal computer continues a subsequent process of determining whether the RNDIS interface is switched to the PCUI successfully.

18. The data card according to claim 17, wherein the request receiving module is further configured to, when the personal computer determines that the verification request and the interface switching request are different, receive a web page request sent, by opening a preset web page, by the personal computer, or receive the interface switching request sent through the RNDIS interface again by the personal computer.

19. The data card according to claim 17, wherein the request receiving module is further configured to, when the personal computer does not receive the verification request when a preset time is reached, receive the interface switching request sent through the RNDIS interface again by the personal computer, or receive a web page request sent, by opening the preset web page, by the personal computer.

* * * * *